United States Patent [19]

Spamer et al.

[11] Patent Number: 4,565,725

[45] Date of Patent: Jan. 21, 1986

[54] COMPOSITE PLASTIC TRACK AND METHOD OF MAKING

[75] Inventors: William S. Spamer, Roswell, Ga.; Alan D. Preis, Peninsula, Ohio

[73] Assignee: The Mead Corporation, Dayton, Ohio

[21] Appl. No.: 585,396

[22] Filed: Mar. 2, 1984

[51] Int. Cl.⁴ .............................................. B32B 3/28
[52] U.S. Cl. ................................... 428/167; 428/447; 428/451; 264/171; 264/177 R; 156/244.25; 211/59.2
[58] Field of Search ............................ 264/177 R, 171; 428/167, 447, 451; 156/244.25; 211/59.2

[56] References Cited

U.S. PATENT DOCUMENTS 2,218,444 10/1940 Vineyard ............................. 211/49
4,470,943 9/1984 Preis .

OTHER PUBLICATIONS

"Silicone-Lubricated Thermoplastics" Duncan et al., Nov. 1972 issue of Modern Plastics.
"Information About Silicone Fluids" Dow Corning ® 200 Fluid Silicone Plastic Additive.

Primary Examiner—Joseph L. Schofer
Assistant Examiner—N. Sarofim
Attorney, Agent, or Firm—Rodgers & Rodgers

[57] ABSTRACT

A plastic track of composite construction is for use as an integral part of display stands of the gravity feed type which are commonly used in retail outlets and is formed by a coextrusion method wherein a quantity of high impact polystyrene is heated to an extrudable temperature while a mixture of high impact polystryene and organopolysiloxane is similarly heated and extruded and the two molten melts are joined homogeneously under temperature and pressure within the die head to form a mechanically strong strack having a low friction sliding surface.

7 Claims, 3 Drawing Figures

COMPOSITE PLASTIC TRACK AND METHOD OF MAKING

This invention relates to a plastic track of composite construction and to a method of forming such a track by coextrusion and so as to form a mechanically strong structure having a low friction slide surface.

BACKGROUND ART

U.S. Pat. No. 4,314,648 issued Feb. 9, 1982 and assigned to the assignee of this invention discloses a gravity feed shelf in which low friction tracks are utilized and which are formed by an extrusion process and which are homogeneous in nature with low friction material impregnated therein.

U.S. patent application Ser. No. 510,495 filed July 5, 1983, now U.S. Pat. No. 4,470,943, and owned by the assignee of this invention discloses and claims a process for forming a low friction plastic track which is homogeneous from a mixture of high impact polystyrene and organo polysiloxane fluid such as dimethyl, diethyl, and phenylmethyl siloxane and related copolymers.

DISCLOSURE OF THE INVENTION

According to this invention in one form a composite track is formed by a coextrusion process in which high impact polystyrene is extruded simultaneously with an extrusion of a mixture of high impact polystyrene and organopolysiloxane, the two extruded melts being brought together in a common co-extrusion die at elevated temperatures and pressures sufficient to form a continuous homogeneous bond at the interface of the two materials. The mixture of high impact polystyrene and organopolysiloxane is such that the organopolysiloxane constitutes between 2% and 10% by weight of the mixture.

BEST MODE OF CARRYING OUT THE INVENTION

Figure 1:
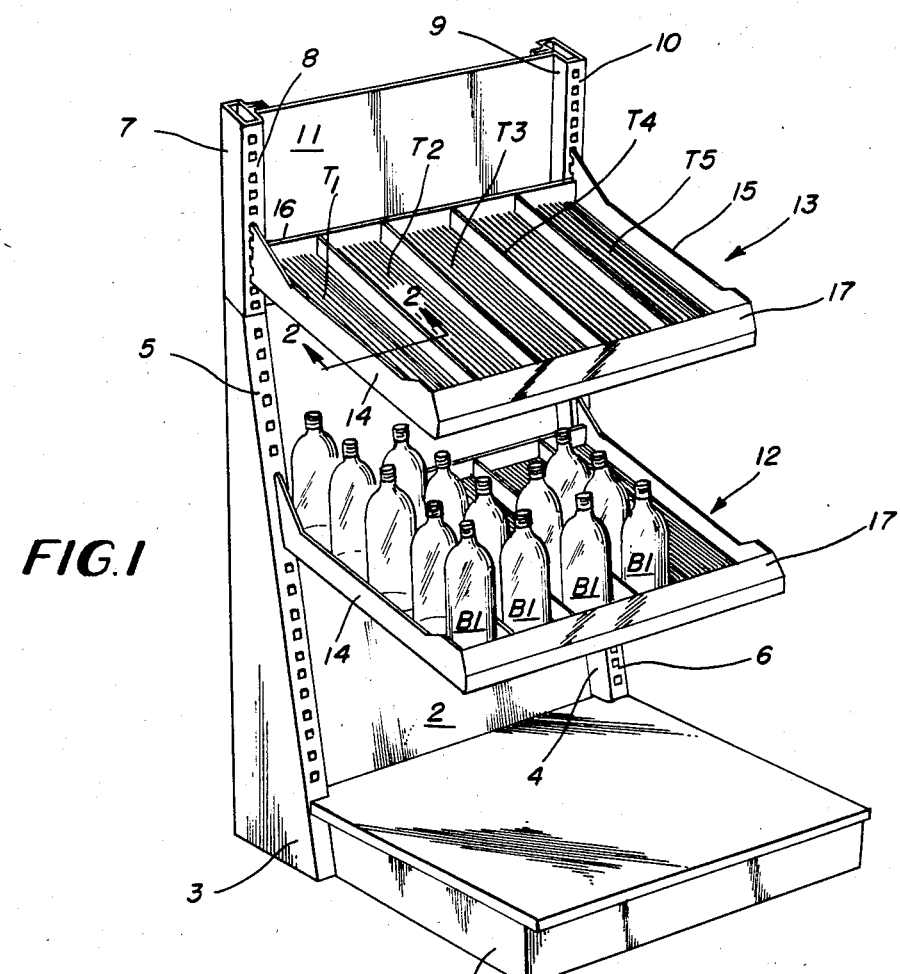
FIG. 1 is a perspective view of a display stand having gravity feed shelves utilizing plastic tracks formed according to this invention.

FIG. 1 shows a soft drink display stand comprising a base 1 and a back panel 2 extending upwardly from the base. Back panel 2 is supported by upright shelf support members 3 and 4 having slotted sloping surfaces 5 and 6 respectively. Secured atop support element 3 is a vertically disposed support element 7 having a vertically disposed slotted support face 8. Similarly a vertically disposed support 9 is mounted atop support element 4 and is provided with a slotted vertical face 10. Back panel 11 is supported by supports 7 and 9. Shelves generally indicated at 12 and 13 are mounted respectively on inclined slotted faces 5 and 6 and on vertically disposed slotted faces 8 and 10.

The shelves 12 and 13 are substantially identical and are supported in substantially parallel relationship to each other on the respective sloping and vertical support faces. Tabs on the shelves cooperate with slots on the sloping and vertical faces in different ways. Thus the shelves are maintained in parallel relationship by virtue of the fact that the tab structure and the angle of the sloping faces of the support members cooperate in such manner as to achieve this result. The manner in which this is accomplished is explained in U.S. Pat. No. 3,983,822 issued Oct. 5, 1976.

As shown in the drawings, each of the shelves such as 12 and 13 comprises a substantially rigid frame structure on which a plurality of channel shaped tracks are mounted. The shelf such as 13 includes side struts 14 and 15, a rear strut 16 and a forward strut 17. An intermediate support element 22 is interconnected at its ends with side struts 14 and 15.

Figure 2:
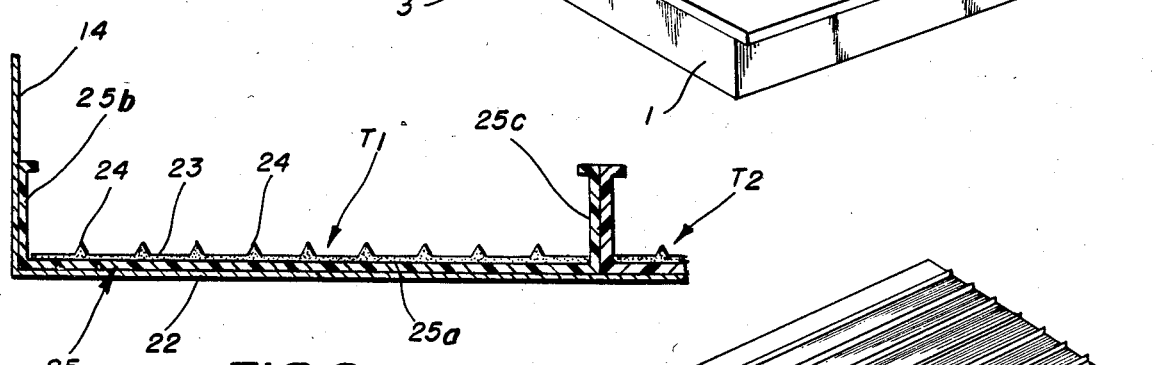
FIG. 2 is a cross sectional view taken along the line designated 2—2 in FIG. 1

As is apparent from FIGS. 1 and 2, the shelves 12 and 13 are downwardly and forwardly inclined. Thus there is a natural tendency for a row of bottles B to slide downwardly and forwardly so that the lowermost bottles such as B1 normally rest against the vertically disposed portion of lower support strut 17.

The tracks such as T1-T5 are formed as indicated in FIG. 2 and include a slide plate 23 having a plurality of ribs 24 which are of triangular cross sectional configuration. The slide plate 23 is bonded along its lower surface to the upper surface of base plate 25. As is indicated in FIG. 2 base plate 25 includes a central web panel 25a and a pair of upstanding flange panels 25b and 25c.

Figure 3:
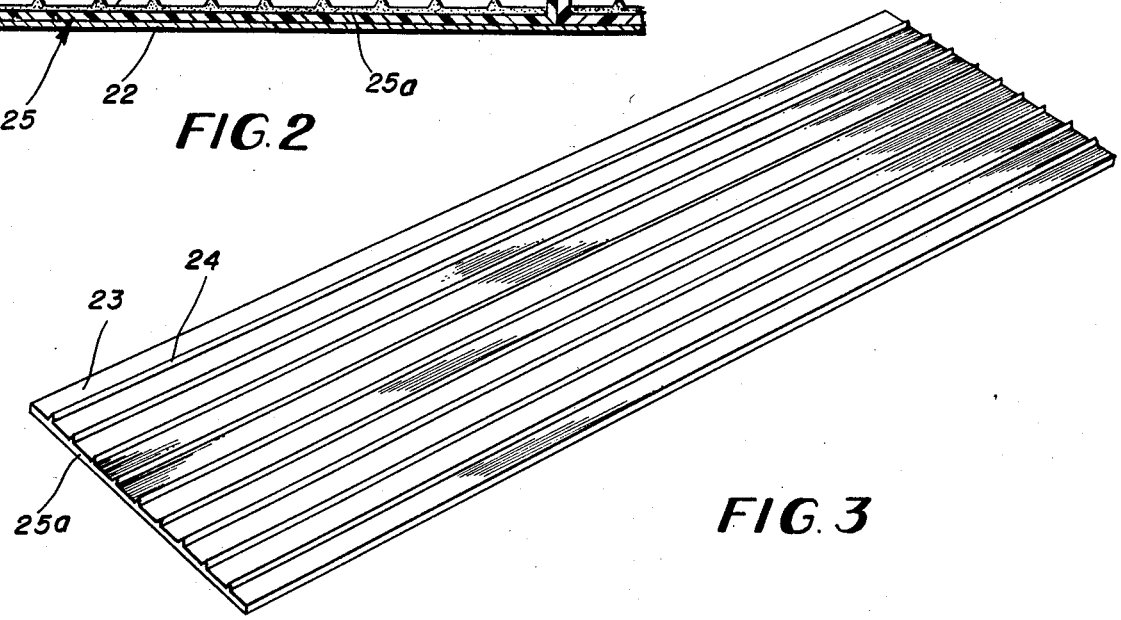
FIG. 3 is a perspective view of another form of the invention differing somewhat from that represented in FIG. 2.

The arrangement of FIG. 3 is identical to that shown in FIG. 2 except that the flange structures 25b and 25c of the arrangement shown in FIG. 2 are omitted from the track shown in FIG. 3. Stated otherwise both arrangements of FIGS. 2 and 3 include a base plate such as 25a which is generally rectangular in cross section as is apparent from FIGS. 2 and 3 and a slide plate such as 23. It is apparent that in shelves where the arrangement of FIG. 3 is utilized, a number of structures such as are shown in FIG. 3 are disposed in side by side downwardly inclined relation so as to form a substantially flat inclined plane on which the low friction ribs 24 are formed.

Since the cost of organopolysiloxane is substantially in excess of the cost of high impact polystyrene, it is apparent that a substantial cost reduction is effected according to this invention particularly since it is apparent from FIGS. 2 and 3 that the slide plate 23 is relatively thin compared to the base plate 25a. While the invention is not limited to a particular thickness of the slide plate 23 or of the base plate 25a, it has been determined that a thickness of the slide plate 23 at points between the low friction ribs 24 of approximately 0.003 inches and a thickness of approximately 0.080 inches of the base plate 25a performs satisfactorily. A track constructed according to this invention is more efficient because organopolysiloxane tends to migrate toward the surface of the slide plate 23 thus affording a tendency to lubricate the slide surfaces and particularly the apexes of the ribs 24. This phenomenon obviously tends to reduce the friction of the slide plate 23 and is achieved without using the relatively expensive organopolysiloxane in the formation of the mechanically strong base plate 25a.

By removing the organopolysiloxane from the mechanically strong base plate, it is possible to effect ultrasonic or adhesive welding of these profiles to themselves or to other structural profiles made from high impact polystyrene.

The following table includes temperatures for various parts of a main profile extruder and for the satellite co-extruder which constitute a hybrid gravity feed track.

| Main Profile Extruder 3¼" Diameter Screw (24-1 Length/Diameter) 75 H.P. D.C. Drive Unit | |
|---|---|
| Zone | |
| 1 | 280° F. |
| 2 | 310° F. |
| 3 | 325° F. |
| 4 | 360° F. |
| 5 | 385° F. |
| Gate | 330° F. |
| Die | 370° F. |
| Melt Temperature | 385° F. |
| Melt Pressure | 1070 (PSI) |
| Actual Screw Speed | 7.38 Rev/Min |
| Satellite Co-Extruder 2" Diameter Screw (24-1 Length/Diameter) 20 H.P. D.C. Drive Unit | |
| Zone | |
| 1 | 330° F. |
| 2 | 350° F. |
| 3 | 360° F. |
| Gate | 340° F. |
| Die | 340° F. |
| Transfer Manifold | 350° F. |
| Melt Temperature | 360° F. |
| Melt Pressure | 950 (PSI) |
| Actual Screw Speed | 42.86 Rev/Min. |

INDUSTRIAL APPLICABILITY

The invention is particularly well adapted for use in connection with low friction gravity feed tracks used in display stands and utilizes the mechanically strong characteristics of high impact polystyrene and the low friction characteristics of organopolysiloxane without impairing such low friction characteristics while at the same time substantially reducing the cost of producing such low friction tracks.

We claim:

1. A plastic track comprising an elongated base plate formed of high impact polystyrene and a low friction slide plate bonded to the upper surface of said base plate and formed of high impact polystyrene impregnated with 2% to 10% by weight of organopolysiloxane.

2. A plastic track according to claim 1 wherein said base plate includes a pair of flange panels of high impact polystyrene integrally formed along the side edges of said base plate.

3. A method of making a composite plastic track having a base plate to which a slide track is secured in flat face contacting relation, the method comprising the steps of heating a quantity of high impact polystyrene to a temperature at which said high impact polystyrene may be extruded, heating a mixture of high impact polystyrene and organopolysiloxane comprising 2% to 10% by weight of said mixture to a temperature at which said mixture may be extruded, pumping these extruded melts of high impact polystyrene and said mixture through a common co-extrusion die which utilizes separate melt channels until such time as the two materials are disposed in contacting relationship while in a hot fluid state so as to form a bond therebetween, the temperature to which the high impact polystyrene is heated is approximately 385 degrees F. and the temperature to which said mixture is heated is approximately 360 degrees F.

4. A method according to claim 3 wherein the die through which said high impact polystyrene is extruded is generally rectangular in cross sectional configuration.

5. A method according to claim 4 wherein the die through which said high impact polystyrene is extruded includes parts communicating with opposite ends of the rectangularly shaped part thereof and in substantially normal relation thereto.

6. A method according to claim 3 wherein the die through which said mixture is extruded in configured to form a slide plate having one surface which is flat and an opposite surface having a plurality of spaced parallel ribs of generally triangular cross section and wherein the flat surface of said slide plate is secured in flat face contacting relation with a surface of said base plate.

7. A method according to claim 3 wherein the pressure of said high impact polystyrene after heating is approximately 1070 pounds per square inch and the pressure of said mixture after heating is approximately 950 pounds per square inch.

* * * * *